(12) United States Patent
Coakley et al.

(10) Patent No.: US 12,202,753 B2
(45) Date of Patent: *Jan. 21, 2025

(54) FLUID REMANUFACTURING

(71) Applicant: Clean Water Tech, LLC, Austin, TX (US)

(72) Inventors: Timothy G. Coakley, Roswell, NM (US); Zacariah L. Hildenbrand, El Paso, TX (US)

(73) Assignee: Clean Water Tech, LLC, Austin, AS (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/439,229

(22) Filed: Feb. 12, 2024

(65) Prior Publication Data
US 2024/0182334 A1    Jun. 6, 2024

Related U.S. Application Data

(63) Continuation of application No. 16/919,838, filed on Jul. 2, 2020, now Pat. No. 11,530,146.

(60) Provisional application No. 62/870,535, filed on Jul. 3, 2019.

(51) Int. Cl.
| | |
|---|---|
| *C02F 1/78* | (2023.01) |
| *C02F 1/00* | (2023.01) |
| *C02F 3/12* | (2023.01) |
| *C09K 8/04* | (2006.01) |
| *C02F 101/10* | (2006.01) |
| *C02F 103/10* | (2006.01) |
| *C02F 103/36* | (2006.01) |

(52) U.S. Cl.
CPC ............... *C02F 1/78* (2013.01); *C02F 1/004* (2013.01); *C02F 3/1294* (2013.01); *C09K 8/04* (2013.01); *C02F 2101/101* (2013.01); *C02F 2103/10* (2013.01); *C02F 2103/365* (2013.01); *C02F 2201/002* (2013.01); *C02F 2201/78* (2013.01); *C02F 2301/026* (2013.01); *C02F 2303/04* (2013.01); *C02F 2303/06* (2013.01)

(58) Field of Classification Search
CPC ...... C02F 1/46; C02F 1/32; C02F 1/48; C02F 1/72; C02F 1/70; C02F 1/34; C02F 1/3278
See application file for complete search history.

(56) References Cited

U.S. PATENT DOCUMENTS

2002/0110508 A1 *   8/2002   Campo ............... C02F 1/72
                                                423/511

* cited by examiner

*Primary Examiner* — Walter D. Griffin
*Assistant Examiner* — Cameron J Allen
(74) *Attorney, Agent, or Firm* — Dubois, Bryant & Campbell, LLP; William D. Wiese

(57) ABSTRACT

Wastewater is remanufactured with ozone in a series of mixing vessels. The ozone is dispersed to both a top and a bottom portion of each mixing vessel, but in different amounts. This creates an electrical potential difference across the height of each mixing vessel which significantly improves the oxidation of organic carbon-based impurities and eliminates H2S and bacteria. Sludge and solids floating to the top of each mixing vessels are removed, as well as sludge and solids settling to the bottom of the mixing vessels. When oil and gas well wastewater is treated in this manner, the resulting treated water is purified and has a high salt content suitable for oil or gas well injection.

15 Claims, 16 Drawing Sheets

| HO TREATED PW | Hyperozonation | Standard Ozone | Standard Ozone + Peroxide |
|---|---|---|---|
| NAME | AREA (Arb Units) | ~AREA | ~AREA |
| Cyclohexanone | 10.1M | 140K | 90K |
| Pyridine, 2,5-dimethyl- | 9.1M | ND | ND |
| Cyclohexanol | 2.5M | 80K | ND |
| Methyl Isobutyl Ketone (MIBK) | 2.3M | ND | 70K |
| Pyridine | 2.3M | ND | ND |

FIG. 13

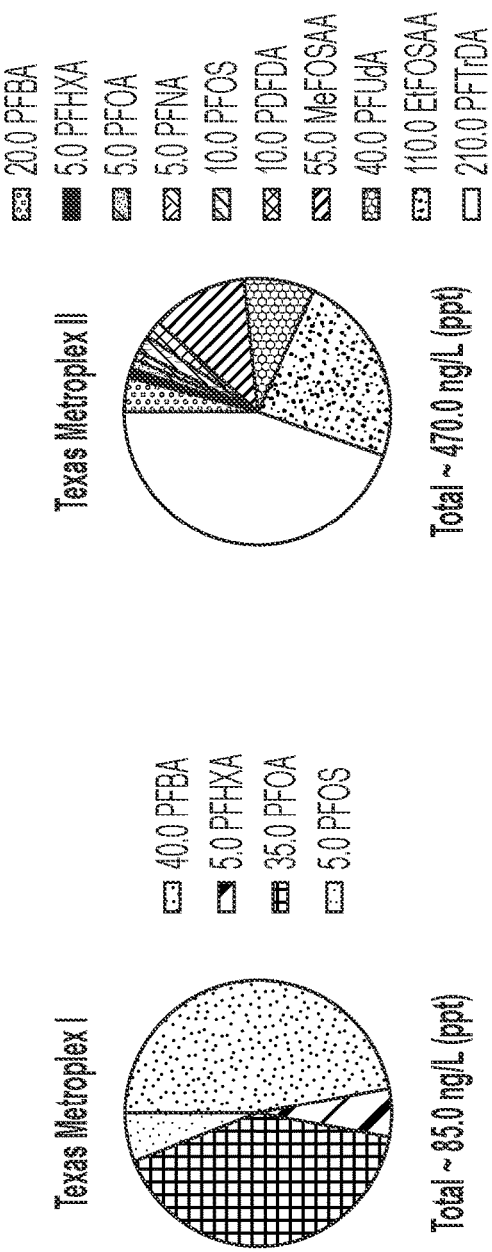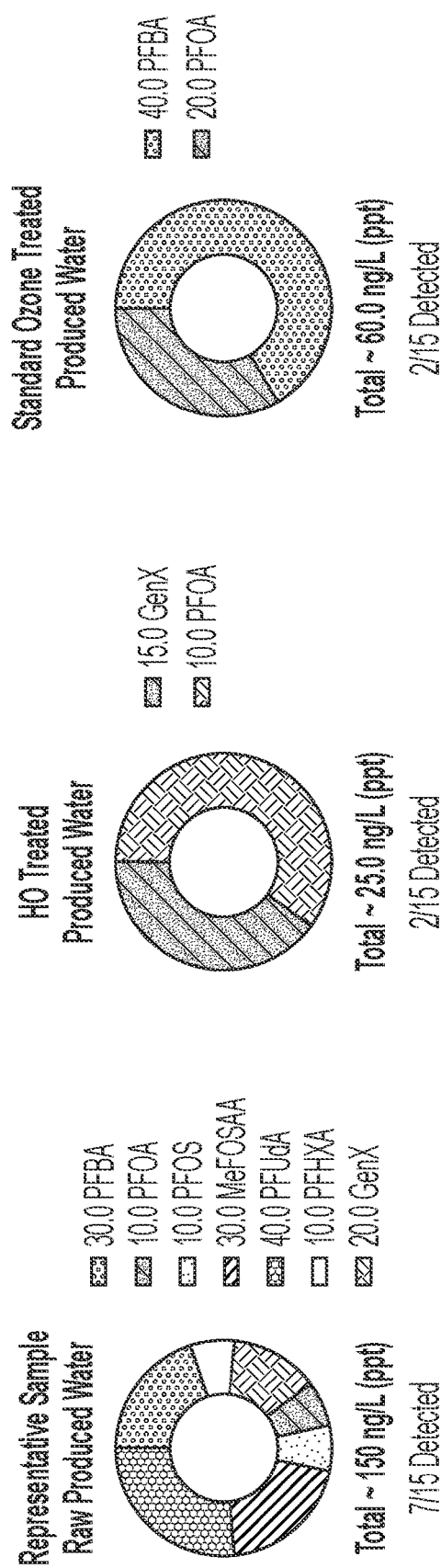
FIG. 14A
FIG. 14B

FLUID REMANUFACTURING

PRIORITY STATEMENT UNDER 35 U.S.C. § 119 & 37 C.F.R. § 1.78

The present application is a continuation-in-part of, and incorporates by reference, U.S. Utility patent application Ser. No. 17/966,582, filed Oct. 14, 2022 in the name of Timothy G. Oakley, entitled "FLUID REMANUFACTURING," which claims priority from and incorporates by reference U.S. patent application Ser. No. 16/939,838, filed Jul. 2, 2020 in the name of Timothy G. Coakley entitled "FLUID REMANUFACTURING," which claims priority from and incorporates by reference U.S. Provisional Patent Application Ser. No. 62/870,535 filed Jul. 3, 2019 in the name of Timothy G. Coakley entitled "FLUID REMANUFACTURING."

BACKGROUND OF THE INVENTION

1. Field of the Inventive Concepts

The inventive concepts disclosed and claimed herein related generally to water treatment and, more particularly, but not by way of limitation, to methods for removing organic contaminates, solid particulate, and bacterial contaminates from wastewater.

2. Background of the Inventive Concepts

Many industries produce waste fluids which must be treated and recycled or disposed of. The composition of these fluids varies greatly and can include both organic and inorganic contaminants. For example, oil and gas waste fluids include produced water and other saltwater disposal fluids such as flowback water from hydraulic fracturing (fracing) processes. These fluids can be classified as toxic wastes and can have high disposal and handling costs, adding significantly to the cost to produce a barrel of oil.

Governmental regulations, in recognition of the need for conservation of the environment, prohibit the discharge of produced water into navigable waters without the removal first of the water-soluble organics. In addition to the disposal cost, water used for fracing and other petroleum well purposes must be made up-typically with fresh water that can require being trucked in. Salt must then be added to keep clays in the formation from swelling and reducing production flow. Iron reducing and other chelation agents and biocides are also often added to make the fluid inert and compatible with the subterranean environment. This can substantially add to the cost of producing a barrel of oil.

Economic incentive to treat such water is significant. For example, fresh water costs in some locations in New Mexico can be $3.00 to $6.00 per barrel. Disposal costs for 10 barrels of produced water associated with one barrel of oil can be $12 to $60 in Colorado. These are significant costs, particularly with current depressed oil prices.

Previous attempts to treat wastewater contaminated with hydrocarbons such as produced water from oil and gas wells have included treatment with chlorine, electrodialysis, peroxide, reverse osmosis, and distillation. Chlorine treatment is ineffective in removal of hydrocarbons as it creates chlorinated hydrocarbons. These organic molecules are characterized by the presence of at least one chlorine atom bonded to a carbon atom. Chlorinated hydrocarbons, which are used to make some types of pesticides, can pose dangers to human health. In addition, there are problems with bacteria becoming immune to the chlorine.

Electrodialysis is costly and ineffective against bacteria. Peroxide does little to remove hydrocarbons and distillation is much too expensive. Reverse osmosis membranes are limited to 40,000 TDS (total dissolved solids) in water to be treated. TDS levels above that amount prove to drastically shorten membrane life and throughput rapidly declines. Most produced water that is encountered as a byproduct of mining oil or natural gas is above 40,000 TDS.

While known oxidative methods and industry standard technologies can reduce the content of some water-soluble organics, these methods are relatively complex and/or expensive, and often do not provide the desired results.

SUMMARY OF THE INVENTION

A process is disclosed for remanufacturing wastewater including the steps of initial filtering of the wastewater to remove solids, and remanufacturing the wastewater with ozone to oxidize organic carbon-based impurities and eliminate H2S and bacteria. The ozone is dispersed through inline venturi mixer/injectors and simultaneously in mixing vessels thereby creating two different electrical potentials by applying a differential of ozone concentration. Oxidizing the fluid being remanufactured with ozone in this manner can create a significant ionic flow within each of the treatment vessels, a flow that is contemplated to change the molecular structure of the fluid being created. This restructuring is for the purpose of removing the undesirable fluid characteristics present in solution in the produced feed waters by converting them to contaminants being in suspension during and following the manufacturing process, thereby facilitating their oxidation or removal save NaCl and some long chain hydrocarbons. As these hydrocarbon chains are cleaved, they are freed of some excess carbons by ozone and cut into more durable lengths to be used as a long-term biocidal component of the structured fluid being manufactured. NaCl salt is disassociated and re-associated by the strong ion flow process thereby sharply enhancing the ionic strength of the end product termed structured fluid. Both floating and settled sludge and solids are removed by blowdown from the treatment vessels via discharging a small portion of the ozonated wastewater from the process to a dewater or filtration dumpster. The fluid discharged is filtered, collected, and sent back to the headworks of the manufacturing system thereby negating the need for fluid disposal or any chemicals to be used. Sludge and solid contaminants that remain suspended, resulting from complete oxidation and ion bombardment of the produced waters with ozone are further removed by filtration.

In one embodiment, the wastewater includes oil and gas well wastewater and the resulting structured fluid is pure without a biocidal content and with a high salt content suitable for oil or gas well stimulation or maintenance. The fluid can be used to maintain disposal wells and stimulate production wells among many other uses.

BRIEF DESCRIPTION OF THE DRAWINGS

The accompanying drawings, which are incorporated in and constitute a part of this specification, illustrate one or more implementations described herein and, together with the description, explain these implementations. The drawings are not intended to be drawn to scale, and certain features and certain views of the figures may be shown exaggerated, to scale or in schematic in the interest of clarity and conciseness. Not every component may be labeled in every drawing. Like reference numerals in the figures may represent and refer to the same or similar element or function. In the drawings:

FIG. 13 is a chart comparing the byproducts generated by hyperozonation compared to those generated by standard oxidation.

FIGS. 14A and 14B are charts showing the makeup of municipal water and its constituents after processing.

DESCRIPTION OF THE PREFERRED EMBODIMENTS

Figure 1:
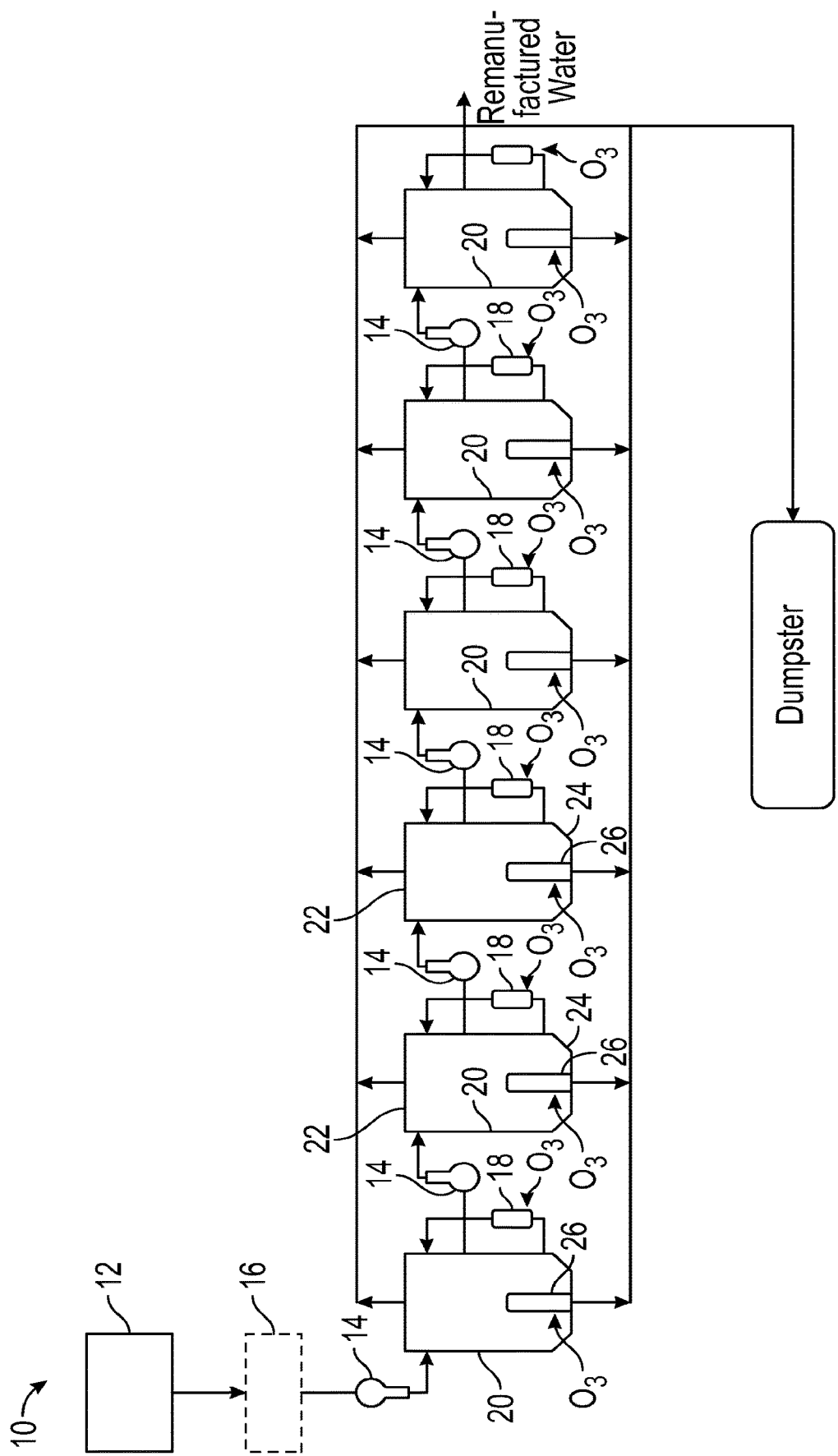
FIG. 1 is a flow chart of one embodiment of the inventive process described herein.

Before explaining at least one embodiment of the presently disclosed inventive concept(s) in detail, it is to be understood that the presently disclosed inventive concept(s) is not limited in its application to the details of construction and the arrangement of the components or steps or methodologies set forth in the following description or illustrated in the drawings. The presently disclosed inventive concept(s) is capable of other embodiments or of being practiced or carried out in various ways. Also, it is to be understood that the phraseology and terminology employed herein is for the purpose of description and should not be regarded as limiting. Unless otherwise defined herein, technical terms used in connection with the presently disclosed inventive concept(s) shall have the meanings that are commonly understood by those of ordinary skill in the art. Further, unless otherwise required by context, singular terms shall include pluralities and plural terms shall include the singular.

All of the articles and/or methods disclosed herein can be made and executed without undue experimentation in light of the present disclosure. While the articles and methods of the presently disclosed inventive concept(s) have been described in terms of preferred embodiments, it will be apparent to those of skill in the art that variations may be applied to the articles and/or methods and in the steps or in the sequence of steps of the method described herein without departing from the concept, spirit, and scope of the presently disclosed inventive concept(s). All such similar substitutes and modifications apparent to those skilled in the art are deemed to be within the spirit, scope, and concept of the presently disclosed inventive concept(s).

As utilized in accordance with the present disclosure, the following terms, unless otherwise indicated, shall be understood to have the following meanings:

The use of the word "a" or "an" when used in conjunction with the term "comprising" in the claims and/or the specification may mean "one", but it is also consistent with the meaning of "one or more," "at least one," and "one or more than one." The use of the term "or" in the claims is used to mean "and/or" unless explicitly indicated to refer to alternatives only or that the alternatives are mutually exclusive, although the disclosure supports a definition that refers to only alternatives and "and/or." Throughout this application, the term "about" is used to indicate that a value includes the inherent variation of error for the device, the method being employed to determine the value, or the variation that exists among the study subjects. For example, but not by way of limitation, when the term "about" is utilized, the designated value may vary by plus or minus twelve percent, or eleven percent, or ten percent, or nine percent, or eight percent, or seven percent, or six percent, or five percent, or four percent, or three percent, or two percent, or one percent. The use of the term "at least one of X, Y, and Z" will be understood to include X alone, Y alone, and Z alone, as well as any combination of X, Y, and Z. The use of ordinal number terminology (i.e., "first," "second," "third," "fourth," etc.) is solely for the purpose of differentiating between two or more items and is not meant to imply any sequence or order or importance to one item over another or any order of addition, for example.

As used in this specification and claim(s), the words "comprising" (and any form of comprising, such as "comprise" and "comprises"), "having" (and any form of having, such as "have" and "has"), "including" (and any form of including, such as "includes" and "include") or "containing" (and any form of containing, such as "contains" and "contain") are inclusive or open-ended and do not exclude additional, unrecited elements or method steps.

The term "or combinations thereof" as used herein refers to all permutations and combinations of the listed items preceding the term. For example, "A, B, C, or combinations thereof" is intended to include at least one of: A, B, C, AB, AC, BC, or ABC, and if order is important in a particular context, also BA, CA, CB, CBA, BCA, ACB, BAC, or CAB. Continuing with this example, expressly included are combinations that contain repeats of one or more item or term, such as BB, AAA, AAB, BBC, AAABCCCC, CBBAAA, CABABB, and so forth. The skilled artisan will understand that typically there is no limit on the number of items or terms in any combination unless otherwise apparent from the context.

As used herein, the term "substantially" means that the subsequently described event or circumstance completely occurs or that the subsequently described event or circumstance occurs to a great extent or degree. For example, when associated with a particular event or circumstance, the term "substantially" means that the subsequently described event or circumstance occurs at least 80% of the time, or at least 85% of the time, or at least 90% of the time, or at least 95% of the time. The term "substantially adjacent" may mean that two items are 100% adjacent to one another, or that the two items are within close proximity to one another but not 100% adjacent to one another, or that a portion of one of the two items is not 100% adjacent to the other item but is within close proximity to the other item.

The term "associate" as used herein will be understood to refer to the direct or indirect connection of two or more items.

The presently disclosed inventive methods allow for the remanufacture of wastewater to a reusable fluid for beneficial use. In one embodiment, the wastewater is from oil and gas well production. Specific advantages include removal of carbon-based impurities while leaving the salt content, elimination of both aerobic and anaerobic bacteria, and removal of impurities such as solids and oxidized materials. When solids, bacteria, and other harmful impurities are removed in a cost-effective manner, the remaining treated water can often be recycled for its original purpose. For example, when solids, bacteria, and other impurities harmful to oil and gas wells are removed in a cost-effective manner, the remaining salt water can be recycled to the well or reservoir. Ozone can be used for converting and removing the water-soluble organic materials in produced water and for complete disinfection. In one embodiment, ozone is used to generate a positive ion flow during the fluid remanufacturing process.

Ozone has been extensively used in Europe, primarily as a biocide/bactericide since 1892. In 1915 ozone gained acceptance in the United States as a replacement for chlorine gas in the disinfection of drinking water. For example, the State of Nevada specifies that ozone will be used in all municipal water treatment for public use. Waste treatment facilities have also realized the advantages of using ozone for degradation of such natural organic matter as humic and fulvic acids. One of the main advantages of using ozone in the oxidation of chain hydrocarbons is its selectivity for forming nontoxic "oxygenated" byproducts during partial oxidation of the chains. Furthermore, if needed, ozonation can be driven towards total oxidation of those molecules with the end point being actual formation of carbon dioxide and water.

However, very little work was done using ozone to treat produced water prior to the year 2000 compared to ozone used in the municipal and recreation markets. This was largely because ozone was not well understood and the means for generation of ozone was not perceived to be reliable. Ozone parameters such as temperature and pressure in the desired process were not well understood. Ozone can react very rapidly at the elevated temperatures in which wastewater such as oil and gas-produced water is sometimes found and conventionally processed. The presently disclosed inventive methods provide simple, economical procedures for accomplishing the objectives described above.

Overall Process. Turning now to the presently disclosed inventive concept(s) and to FIG. 1, certain embodiments thereof are directed to a process 10 for remanufacturing wastewater from oil and gas wells. The wastewater can be stored in a feed tank 12 after being pre-treated by passing through a pre-filter (not shown) to remove solids. Using, for example, a pump 14, wastewater from the feed tank 12 can optionally be caused to flow through a filter 16 to remove solids and produce a filtrate. The wastewater or filtrate, hereinafter referred to as "wastewater," is remanufactured in a series of mixing vessels 20. Ozone can be dispersed into the wastewater just prior to entering an upper portion 22 of each of the mixing vessels 20 using, for example, an inline venturi mixer 18. Additional ozone is dispersed into wastewater in a lower portion 24 of each mixing vessel 20. Sludge and solid contaminates floating to the upper portion 22 of the mixing vessel 20, and sludge and solid contaminants settling to the lower portion 24 of the mixing vessel 20, are removed on a continuous, periodic, or cyclic basis in a procedure referred to as "blowdown" as is the material removed. The blowdown is pumped to a settling dewater tank which, when full, is returned (the water portion) to the produced water feed tank 12.

Wastewater. Nonlimiting examples of wastewater that can be treated using the present inventive concepts include produced water from oil and gas wells, frac fluid, process fluid, condenser water, chill water, medical and dental service water, and room temperature ozonated water for autoclaving and other purposes.

Wastewater is sometimes referred to herein as "produced water" however, it is understood that other wastewater can be treated alone or in combination with produced water.

Oil and gas well wastewater can contain soluble salts, quantities of aerobic and anaerobic bacteria, solid particulate, hydrogen sulfide (H2S), ferrous and ferric iron, and carbon-based impurities including volatile organic carbon (VOC's), and benzene, toluene, ethyl benzene and xylene (BTEX) which occur naturally in crude oil and can be found in waters in the vicinity of natural gas and petroleum deposits. Frac fluids may additionally contain corrosion inhibitors such as alcohols, organic acids and polymers; surfactants; gelling agents; nitrogenous compounds such as ammonium persulfate; and crosslinkers such as polyol and borax.

Pretreatment. In one non-limiting embodiment, wastewater is pre-filtered using, for example, a 20μ filter to remove solids. Optionally, the wastewater is pre-treated with ozone to reduce the H2S to less than 100 ppm. High H2S levels in the wastewater can be lowered to 100 ppm or less to provide the opportunity to use the system at maximum throughput flow rates.

Filtration. In one embodiment, the water is filtered prior to each stage of ozone treatment. Filtration can be achieved using a number of filtration types including, but not limited to, automatic continuous rinsing filters, membrane filters, media filters, screen filters, disk filters, sand filters, cloth filters, and the like.

In one embodiment, the filter 16 comprises a continuous flow ultrafiltration unit such as a FORSTA® self-cleaning water filter. Ultrafiltration (UF) is one of many membrane treatments being used in water treatment sequences across industries. FORSTA® automatic self-cleaning water filters can reduce the system effluent particle loading, with little interruption to system flow because of the continuous rinsing cycle. In the rinsing cycle, solids larger than 5 microns (u) are removed and recycled via dewatering means to the start, feed tank 12, or "headworks" of the system.

In-Line Ozone Addition. In one embodiment, filtrate discharged from the filter 16 is ozonated using an in-line venturi mixer/injector 18. The venturi mixer/injector 18 uses produced water passing over an orifice to create suction that draws the ozone gas through the orifice into the water stream and mixes it with the water. Ozone flow can be controlled by changing orifice size, turning flow metering valves, or regulating the pump 14 which ultimately creates the suction on the injectors.

Ozone water purification is the most effective FDA approved water purification method for eradicating toxins that are found in water. Ozone or 03 is a powerful oxidant that can kill all bacteria, fungi, and viruses and inactivate pesticides, organic materials, and other contaminates much more potently and completely than chlorine.

Venturi injectors are commonly used to inject ozone or a mixture of air and ozone into water. When pressurized water enters the injector inlet, it is constricted toward the injection chamber and changes into a high-velocity jet stream. The increase in velocity through the injection chamber results in a decrease in absolute pressure, creating a vacuum, thereby enabling the ozone to be drawn through the suction port and entrained into the water stream. As the jet stream is diffused toward the injector outlet, its velocity is reduced and it is reconverted into lower pressure energy. Internal mixing vanes in the injector can create very small bubble sizes, thereby increasing the surface area of gaseous ozone in contact with the liquid, and helping to dissolve the ozone into and throughout the water. It also creates a negative charge in the fluid at the top of the treatment vessel where the ozonated water is fed.

Vessels and Mixer/Injectors. Additional ozone is added to the wastewater in mixer/injectors within a series of two or more mixed tanks, continuous stirred tanks, or stages within a multi-staged reactor, or the like, referred to herein as "mixing vessels." The number of vessels and mixer/injectors can be determined by knowing the flow rate through the mixing vessel. Typically, six (6) mixing vessels are considered an adequate number in a 5,000 barrel per day system. Remanufacturing results and efficiency are maximized by such sequential addition of ozone in contrast to a single batch process. In one non-limiting embodiment, each mixing vessel is preceded with a filter such as a self-rinsing filter.

Figure 2:
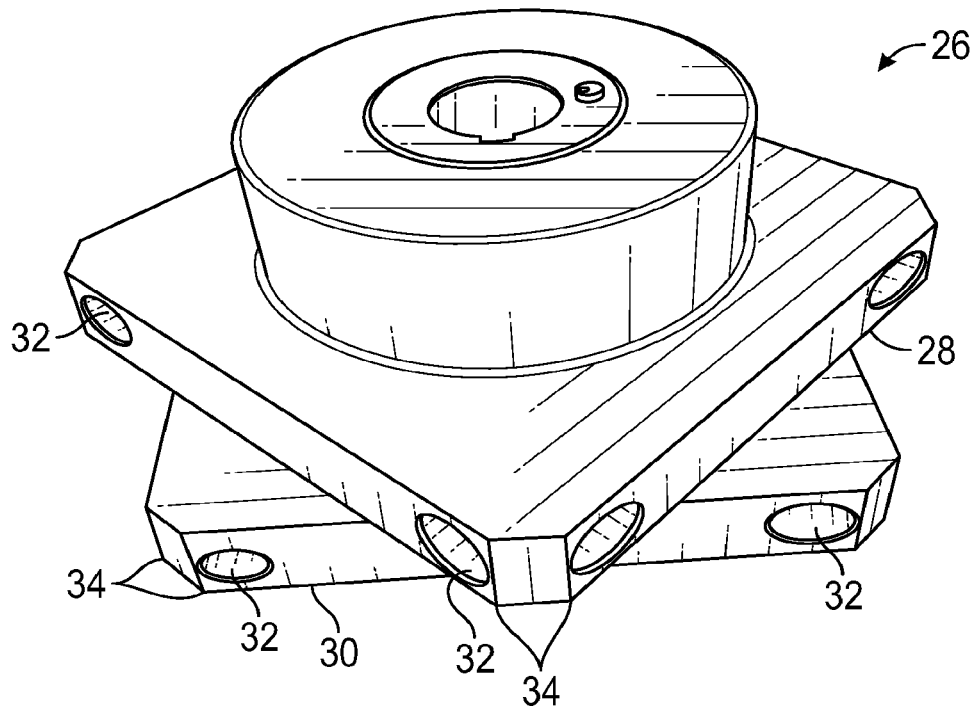
FIG. 2 is a perspective view of an ozone mixer/injector constructed in accordance with the presently disclosed inventive concept(s).

Ozone can be infused into the wastewater in each mixing vessel 20 using a mixer/injector 26 with a submersible motor positioned within a lower portion of the vessel 20. A number of mixer/injector designs have been used for providing the necessary bubble size and distribution including perforated plate spargers and perforated pipe spargers. An exemplary mixer/injector 26 is shown in FIG. 2 and includes two plates, 28 and 30, respectively. Ozone is released from mixer orifices 32 located on corner edges 34 of the plates 28 and 30. The fast-spinning corner edges 34 create a venturi effect and the suction pulls ozone into the wastewater. The rotational speed of the mixer/injector is typically from about 1725 rpm to about 3450 rpm. The ozone enters the mixer/injectors at the central inlet port 36.

Figure 3:
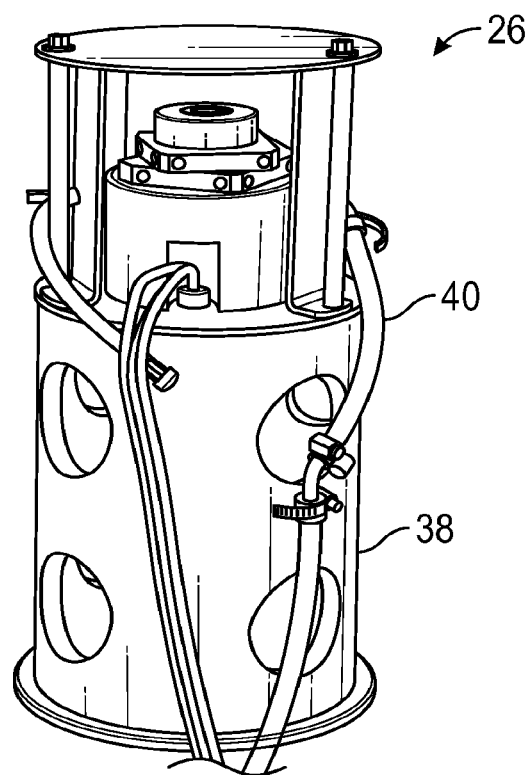
FIG. 3 is a perspective view of the mixer/injector in FIG. 2 attached to a submersible motor within a sleeve.

FIG. 3 shows exemplary mixer/injectors 26 within a sleeve 38 with hoses 40 supplying the ozone. Ozone is routed inside the 8-head rotating mixer/injector 26 to the injection points or orifices 32 located on the 8 corners of the top 28 (plate 1) and bottom 30 (plate 2) sections. Orifice locations are shown in exemplary fabrication drawing 3A show the dimensions of the water inlet holes to be 0.310 inches and the outlet holes are 0.275 inches. It is the perpendicular placement and the internal connection that allows the mixer/injectors 26 to function equally as well as a standard inline venturi mixer/injector.

The ozone addition to the bottom section 24 of the mixing vessel 20 through the mixer/injectors 26 is less than that amount for consumption by the volume of fluid in the short period of time it is in contact. It is believed that the mixer/injectors 26 create a field with a lesser oxidation reduction potential (ORP) than does the venturi injection at the top portion 22 of the mixing vessel 20.

In this manner, it is believed that a major purpose of the ozone addition is to create a large negative electrical potential in the fluid leaving the top 22 of the mixing vessel 20 in contrast to the small quantity of ozone being fed to the rotating mixer/injectors 26 at the bottom 24 of the treatment vessel 20. This differential likely causes a rapid flow of ions from the lower potential ozone blanket at the bottom 24 of the vessel 20 towards the ozone blanket at the top 22 of the mixing vessel 20 thereby driving all first order contaminants in the wastewaters from an "in solution" state to an "in suspension" state. Those contaminants driven into suspension are further acted upon by the molecular ozone in solution at the top 22 of the mixing vessel 20.

Some of the contaminants are long chain hydrocarbons which are oxidized by the ozone thereby producing reaction products with biocidal properties. The cleaved chain sections can function as long-term biocides and are a major positive component of the structured fluid produced by the inventive methods described herein. The relation between ozone and its major anthropogenic precursors, volatile organic compounds (VOC) and oxides of nitrogen (NOx) is described in U.S. Pat. No. 5,236,673 by Coakley, the entire contents of which are expressly incorporated herein by reference.

The remanufactured fluid has a very high ionic strength (in one example the ionic strength is 1.1982 mol/L) and is sometimes referred to as "structured fluid." The high ionic strength is due to the reassociation of the sodium chloride molecules sourced from the produced water and the sequentially altered (polished sodium chloride crystals) by the high ionic fields and resulting collisions created in each of the treatment tanks (for example 6 treatment tanks in series). The ionic strength of the remanufactured structured fluid is a measure of the concentration of ions in that solution. Ionic compounds, when dissolved in water, dissociate into ions. The total electrolyte concentration in the structured fluid solution affects important properties such as the dissociation constant or the solubility of sodium chloride. The high ionic strength creates an ability for the structured fluid to rapidly combine and interact with those ions present in a foreign fluid to which it is added. This is because higher ionic strength leads to a stronger ionic atmosphere in the structured fluid and the strength minimizes attraction between structured fluid ions so they are free to rapidly disassociate. Smaller ions like Na+ and Cl— have a larger effective radius. This is because the solvent cage of water is larger. The other factor associated with effective ionic radius is the charge. A higher charge (a magnitude whether it is positive or negative) attracts more oppositely charged ions.

As previously mentioned, the process described herein involves the processing of wastewater with ozone to oxidize organic carbon-based impurities. This process of adding an excessive amount of ozone or other oxidizing agent to water for the purpose of disinfection, oxidation or purification is also referred to as hyperozonation. The application of high doses of oxidizing agents removes organic and inorganic contaminants, eliminates microorganisms, and improves water quality.

Generally speaking, a significantly higher concentration of the oxidizing agent is used in the hyperozonation process compared to typical ozonation processes. This increased concentration can be effective in addressing particularly challenging water quality issues or achieving specific treatment goals. The excess ozone reacts with pollutants, bacteria, viruses, and other impurities present in the water, breaking them down or neutralizing them.

The oxidizing agents, also known as oxidants or oxidizers, used in the hyperozonation process are chemical substances that have the ability to facilitate an oxidation reaction. Oxidation is a chemical process in which a substance loses electrons, leading to an increase in its oxidation state or the addition of oxygen atoms or other electronegative elements. Oxidizing agents achieve this by accepting electrons from other substances, which are thereby oxidized. Accordingly, oxidizing agents are typically electron-deficient, meaning they have incomplete electron configurations and are eager to gain electrons to become more stable. When an oxidizing agent comes into contact with another substance, it transfers electrons from that substance to itself. This process causes the other substance to lose electrons and undergo oxidation. The oxidizing agent, in turn, gets reduced because it gains electrons.

Oxidation reactions involving oxidizing agents can be highly reactive and can lead to various chemical transformations. The oxidation of organic compounds by oxidizing agents can result in the breaking of chemical bonds and the conversion of one substance into another. More specifically, hyperozonation produces a primary oxidizing agent (ozone) which results in the production of secondary chaotropic agents (hydroxyl radicals and hydrogen peroxide), which collectively disrupt both saturated and unsaturated carbon bonds.

Common examples of oxidizing agents include oxygen, ozone, hydrogen peroxide, chlorine and potassium permanganate, although any substance that oxidizes other substances involved in a reaction by gaining or accepting electrons from them would be considered an oxidizing agent. Oxidizing agents can be used separately or in any combination to effectuate the hyperozonation process.

Figure 4:
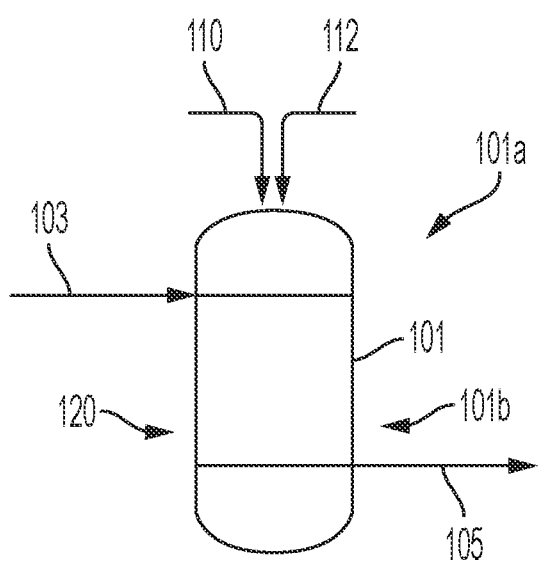
FIG. 4 is a flow chart of one embodiment of the inventive process described herein with the injection of ozone and hydrogen peroxide in a single enclosed vessel.

By way of example and with reference to FIG. 4, a closed mixing vessel 101 is fed with a supply stream of wastewater 103 which, as discussed above, can include produced water from oil and gas wells, frac fluid, process fluid, condenser water, chill water, medical and dental service water, and any other water containing impurities. Ozone 110 and hydrogen peroxide 112 are dispersed into an upper portion 101a of the mixing vessel and another oxidizing agent 120 is dispersed into a lower portion 101b of the mixing vessel. The oxidizing agent 120 can be one or more of oxygen, ozone, hydrogen peroxide, chlorine, potassium permanganate, or any other additive that causes an oxidation-reduction reaction in which the oxidizing agent is reduced as it gains electrons. Contaminates, the makeup of which is discussed in more detail below, are removed through both the upper portion 101a of the mixing vessel 101 and the lower portion 101b of the mixing vessel 101. Treated fluid 105 then exits the mixing vessel.

Figure 5:
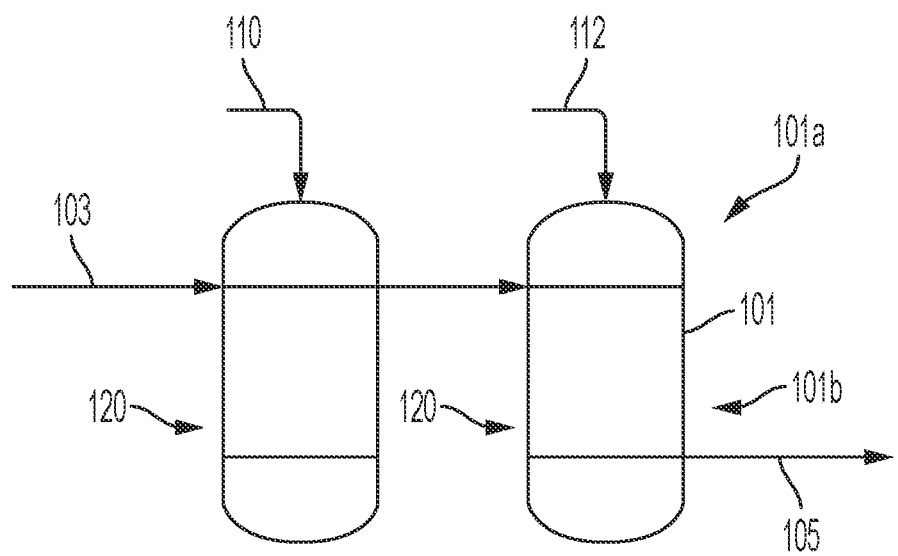
FIG. 5 is a flow chart of an embodiment of the inventive process described herein with the injection of ozone and hydrogen peroxide in tandem enclosed vessels.

Rather than adding ozone 110 and hydrogen peroxide 114 at the upper portion 101a of a single mixing vessel 101, a similar effect can be achieved, as shown in FIG. 5, by dispersing ozone 110 at the upper portion 101a of a first mixing vessel 101 and dispersing hydrogen peroxide 112 at the upper portion 101a of a second mixing vessel. In this arrangement, an oxidizing agent 120 can be added at a lower portion 101b of either the first mixing vessel, the second mixing vessel, or both as shown in FIG. 5.

Figure 6:
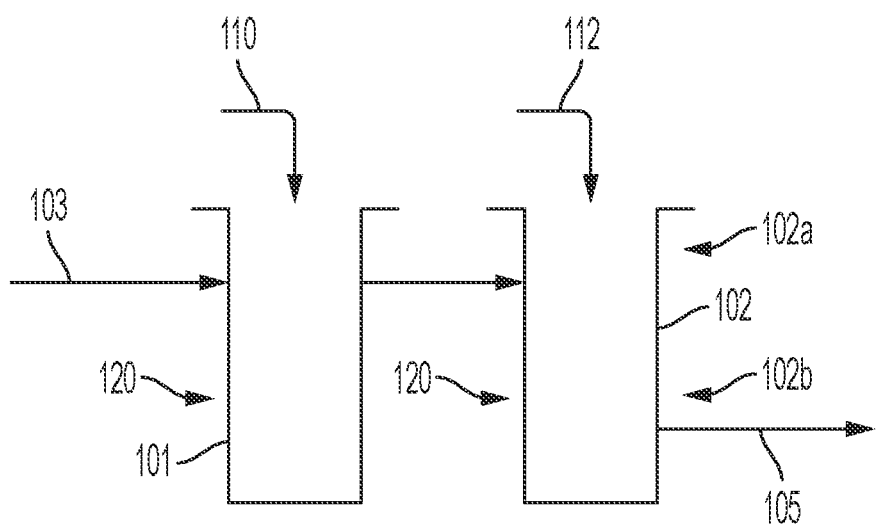
FIG. 6 is a flow chart of one embodiment of the inventive process described herein with the injection of ozone and hydrogen peroxide in tandem open vessels.

The process described in FIG. 6 is similar to the process described in FIG. 5 but the mixing vessels 102 are open. Ozone 110 is dispersed at the upper portion 102a of a first mixing vessel 101 and hydrogen peroxide 112 is dispersed at the upper portion 102a of a second mixing vessel. Another oxidizing agent 120 is dispersed into a lower portion 102b of the mixing vessels. Contaminates are removed through both the upper portion 102a of the mixing vessel 101 and the lower portion 102b of the mixing vessel 101. Treated fluid 105 then exits the second mixing vessel.

Figure 7:
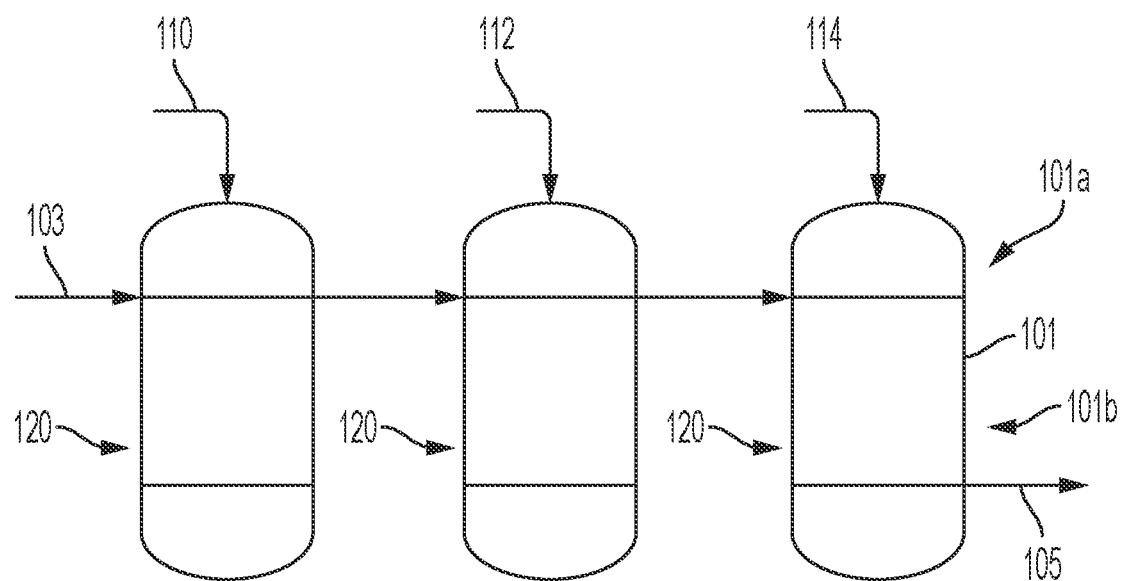
FIG. 7 is a flow chart of one embodiment of the inventive process described herein with the injection of ozone, hydrogen peroxide and permanganate in serial enclosed vessels.
Figure 8:
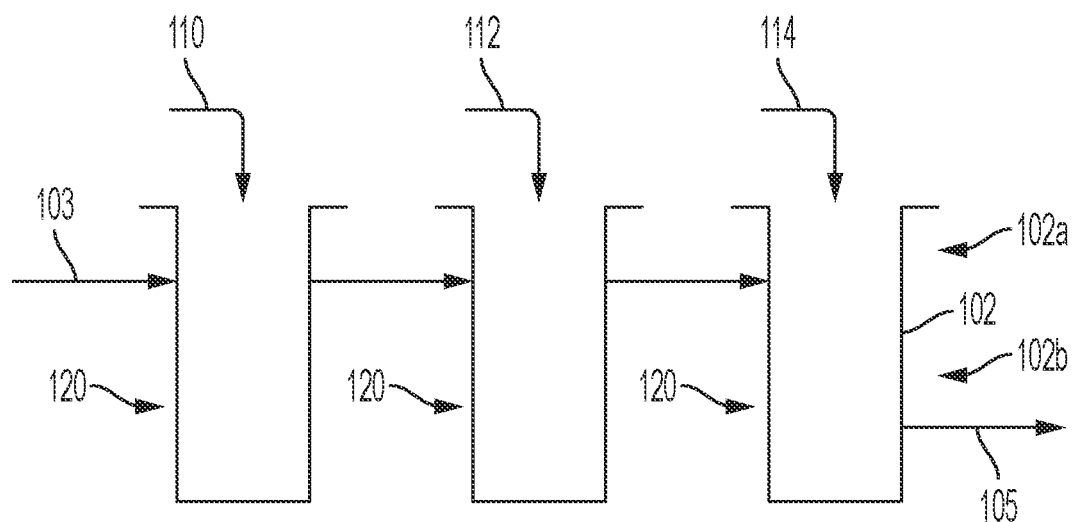
FIG. 8 is a flow chart of one embodiment of the inventive process described herein with the injection of ozone, hydrogen peroxide and permanganate in serial open vessels.

Referring now to FIG. 7 in which wastewater 103 is fed into a first mixing vessel 101 in which ozone 110 is dispersed in an upper portion 101a of the first mixing vessel 101 and another oxidizing agent 120 is dispersed a lower portion 101b of the first mixing vessel 101. The treated wastewater 103 proceeds to a second mixing vessel 101 in which hydrogen peroxide 112 is dispersed in an upper portion 101a of the second mixing vessel 101 and another oxidizing agent 120 is dispersed a lower portion 101b of the second mixing vessel. The treated wastewater 103 proceeds to a third mixing vessel 101 in which permanganate 114 is dispersed in an upper portion 101a of the third mixing vessel 101 and another oxidizing agent 120 is dispersed a lower portion 101b of the third mixing vessel. Treated fluid 105 then exits the third mixing vessel. A similar process is shown in FIG. 8 utilizing open mixing vessels 102 rather than closed mixing vessels 101.

Figure 9:
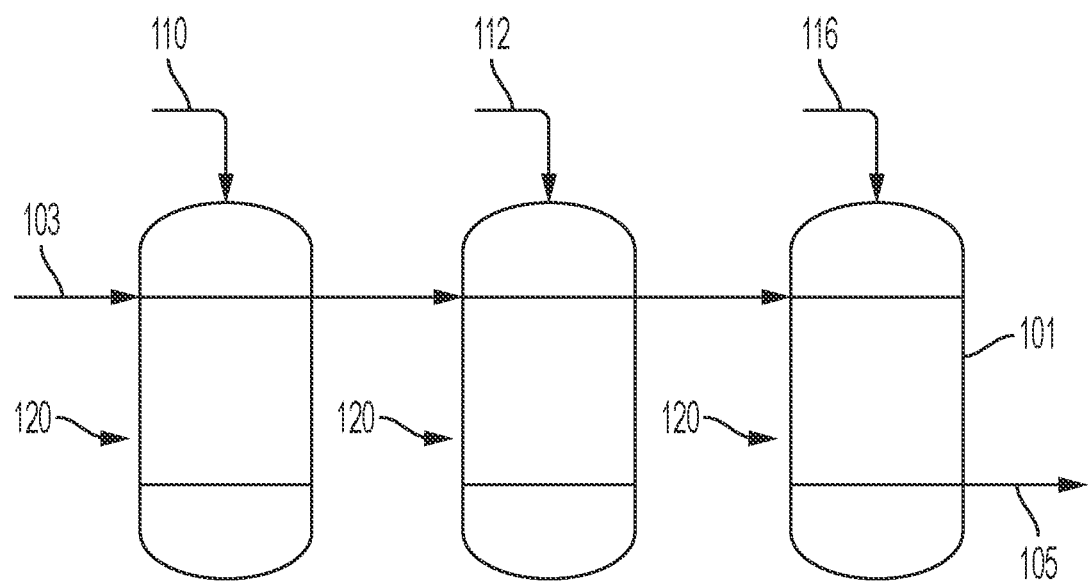
FIG. 9 is a flow chart of one embodiment of the inventive process described herein with the injection of ozone, hydrogen peroxide and chlorine dioxide in serial enclosed vessels.
Figure 10:
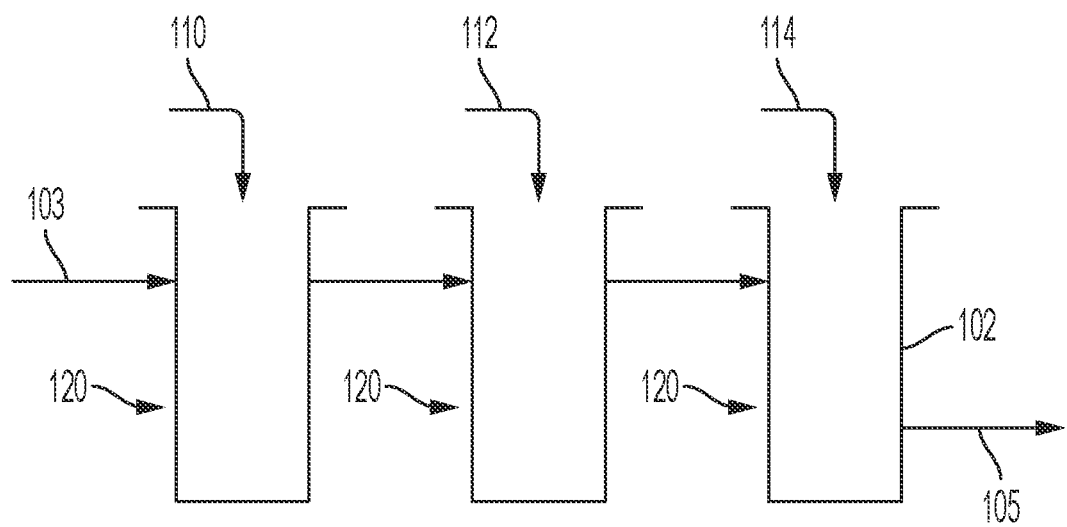
FIG. 10 is a flow chart of one embodiment of the inventive process described herein with the injection of ozone, hydrogen peroxide and chlorine dioxide in serial open vessels.

As shown in FIGS. 9 and 10, the oxidizing agents need not be introduced in any particular order or sequence. In this instance, ozone 110 is added to the upper portion 101a of the first mixing vessel 101 and hydrogen peroxide 112 is dispersed in an upper portion 101a of the second mixing vessel 101. However, rather than permanganate 114 being added to the third mixing vessel 101, chlorine dioxide is added. In each of these instances, another oxidizing agent 120 maybe dispersed in a lower portion 101b of any of the three mixing vessels.

Figure 11:
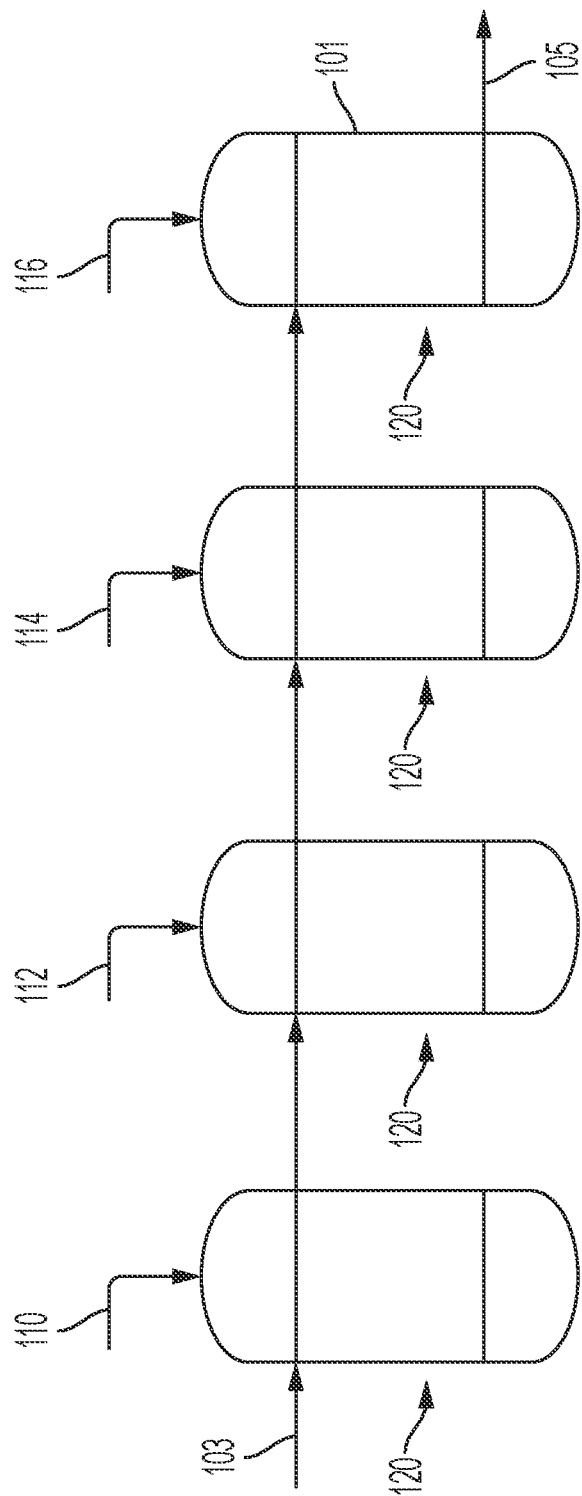
FIG. 11 is a flow chart of one embodiment of the inventive process described herein with the injection of ozone, hydrogen peroxide, chlorine dioxide and permanganate in serial enclosed vessels.
Figure 12:
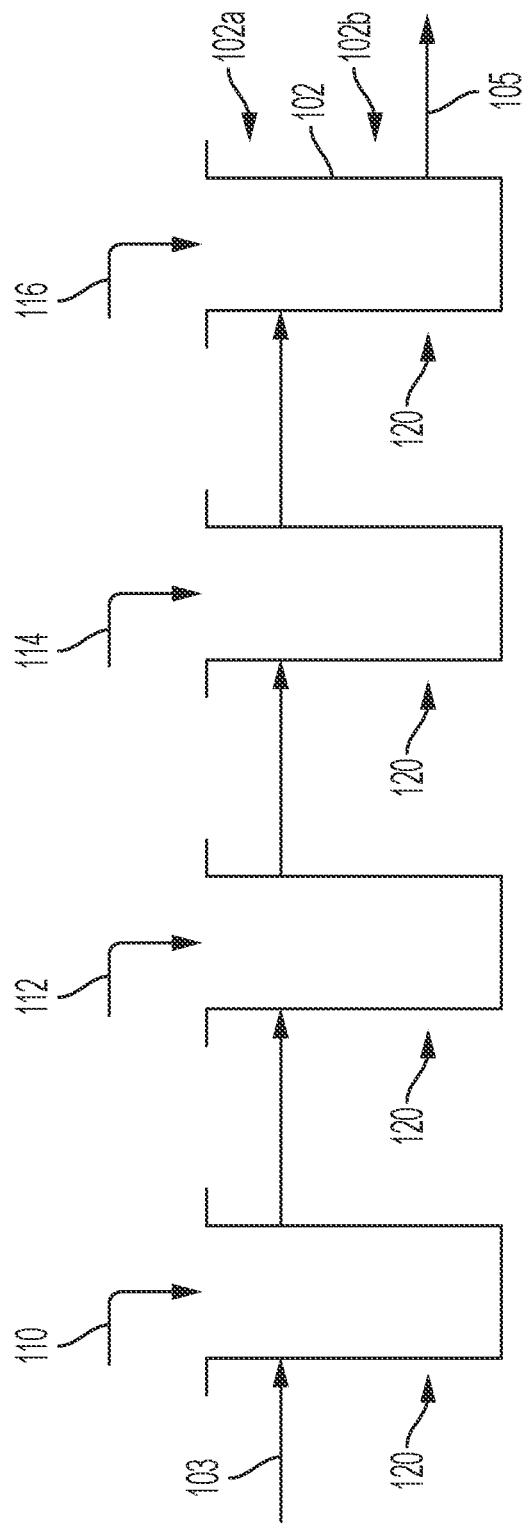
FIG. 12 is a flow chart of one embodiment of the inventive process described herein with the injection of ozone, hydrogen peroxide, chlorine dioxide and permanganate in serial enclosed vessels.

FIGS. 11 and 12 show yet another example of oxidizing agents being introduced in a series of mixing vessels to create the hyperozonation effect. In this example, ozone 110 is introduced into the upper portion 101a of a first mixing vessel, hydrogen peroxide 112 is introduced into the upper portion 101a of a second mixing vessel, permanganate 114 is introduced into the upper portion 101a of a third mixing vessel, and chlorine dioxide 116 is introduced into the upper portion 101a of a fourth mixing vessel.

In each of the foregoing cases, one oxidizing agent may be substituted for another oxidizing agent and the order in which the oxidizing agent is introduced is not relevant in any particular context.

As described above, when hyperozonation is used to treat produced water, the effluent is a clean brine solution. However, this process also results in the precipitation of what is referred to above as "contaminants," which include a wide variety of valuable byproducts. Some of the byproducts of the hyperozonation process and their potential uses are shown in Table 1.

TABLE 1

| Byproduct | Potential Use |
| --- | --- |
| Acetophenone | Used as a fragrance in soaps and perfumes, as a flavoring agent in foods, and as a solvent for plastics and resins. |

TABLE 1-continued

| Byproduct | Potential Use |
|---|---|
| Ammonia | Used as a fertilizer and as a refrigerant gas, for purification of water supplies, and in the manufacture of plastics, explosives, textiles, pesticides, dyes and other chemicals. |
| Benzene | Used in industrial processes to make plastics, resins, synthetic fibers, lubricants, and dyes. |
| Benzothiazole | Exhibits a wide range of biological properties including anticancer, antimicrobial, and antidiabetic, anticonvulsant, anti-inflammatory, antiviral, and antitubercular activities. |
| Cyclohexanol | Used in the manufacture of nylon, lacquers, paints and varnishes and as a solvent in cleaning and degreasing operations |
| Cyclohexanone | Used as a solvent in insecticides, wood stains, paint and varnish removers, spot removers, cellulosics, and natural and synthetic resins and lacquers |
| Lithium | Used in heat-resistant glass and ceramics, lithium grease lubricants, flux additives for iron, steel and aluminum production, lithium metal batteries, and lithium-ion batteries |
| Methyl Isobutyl Ketone (MIBK) | Used as a solvent for gums, resins, paints, varnishes, lacquers, and nitrocellulose |
| Pyridine | Used as a solvent for paint, rubber, pharmaceuticals, polycarbonate resins and textile water repellants |

The list of byproducts and their uses identified in Table 1 is exemplary only and not intended to be exhaustive. For example, the treatment of produced water with hyperozonation also produces multiple quaternary ammonium-like compounds (i.e., benzyldimethyl-tetradecylammonium) and saponins (i.e., steroidal and triterpene saponins) which are used as paraffin dispersants and natural surfactants, respectively. Of particular relevance is that, in addition to the desired treated water effluent produced by the hyperozonation process, the "contaminants" that are removed during the process include a variety of commercially valuable byproducts.

It is important to note that the hyperozonation process described herein produces vastly different byproducts than a typical ozonation process. As can be seen in FIG. 13, the hyperozonation process produces a dramatic improvement in the generation of byproducts over the use of ozone alone or ozone in combination with peroxide. For example, treating production water with standard ozone and peroxide results in an area of approximately 90,000 and treatment with standard ozone results in an area of 140,000, treatment with the hyperozonation process results in an area of 10,100,000, an increase of over 7,000 percent. Similar results are also obtained with cyclohexanol. Importantly, some byproducts, such as pyridine and MIBK are entirely undetectable when using a standard ozone treatment but are produced in sizeable quantities when treated with hyperozonation.

Another beneficial aspect of the hyperozonation process is that the process is extremely effective at removing per- and polyfluoroalkyl substances (PFAS) and perfluorooctanoic acid (PFOA) species from water, which is particularly pertinent given the concern over these recalcitrant compounds by various technical organization, including the U.S. Environmental Protection Agency. According to the EPA, the lifetime drinking water health advisory level for perfluorooctane sulfonic acid (PFOS) is 0.07 micrograms per liter ($\mu g/L$). The EPA also has an interim health advisory level of 0.020 ng/L for PFOS. The EPA's 2016 drinking water health advisory level for the combined concentrations of PFOS and perfluorooctanoic acid (PFOA) is 70 parts per trillion (0.07 $\mu g/L$). The EPA recommends that drinking water systems take steps to assess contamination, inform consumers, and limit exposure above these levels. Seven states have developed their own water guideline levels for PFOA and/or PFOS ranging from 0.013 to 1.000 $\mu g/L$. Representative constituents of municipal drinking water from two municipalities in Texas are shown in FIG. 14A. The level of PFOS in Texas Metroplex I is 0.005 $\mu g/L$ (5.0 ng/L) and the level of PFOS in Texas Metroplex II is 0.0100 $\mu g/L$ (10.0 ng/L).

The hyperozonation process is far more effective at treating PFAS/PFOS compared to other oxidation modalities, including standard ozone treatment. Referring now to FIG. 14B, treating produced water having PFOA/PFOS totaling 150.0 ng/L with a standard ozonation process results in a reduction in PFOA/PFOS to 60.0 ng/L. However, treating the same produced water with the hyperozonation process, reduces the PFOA/PFOS to 25.0 ng/L, less than half the quantity resulting from treatment with ozone alone.

Le Chatelier's equilibrium principle states that a reaction stays in equilibrium unless acted on by an outside force; then the reaction will shift to accommodate the new force and re-establish equilibrium. This means that if you want a reaction to shift, you just apply an outside force, such as concentration change via adding structured fluid. In the case of the Common Ion Effect, a reaction can be shifted by adding an ion that is common to both solutes such as sodium chloride, thus changing the concentration of the ion in solution and shifting the equilibrium of the reaction. The net effect of the common ion is that it reduces the solubility of the solute in the solution. The common ion effect can make insoluble substances more insoluble. The common ion effect is a cornerstone of the effectiveness of structured fluid. The stability of the fluid, even after years in storage out of sunlight its efficacy is unaffected by time due to the purity of the structure of the fluid.

Consistency of purpose is achieved in the structured fluid by acting on and oxidizing the lone carbons remaining in the natant through subsequent stages of remanufacture. Such complete removal is essential to accomplish the high ionic strength and efficacy for long periods of storage.

Blow Down/Up Control. To maximize the remanufacturing results and efficiency, sludge and solids are removed from each stage so that they are not delivered to the next stage and re-exposed to ozone.

In one embodiment, sludge and solids are periodically and alternately removed from the top and the bottom of each of the mixing vessels 20. This can be accomplished by maintaining the mixing vessels under pressure, typically from around 10 to 25 psig, and alternating the release of a top blowdown valve located near the top of the mixing vessel and a bottom blowdown valve at or near the bottom of the mixing vessel. Top and bottom blowdown intervals can be different in each mixing stage, and the frequency and duration will vary with the quality of wastewater treated.

When remanufacturing produced water, the top blowdown valve may be open for an interval of about 3 to about 15 seconds. The bottom blowdown valve may be open for an interval of about 3 to about 1550 seconds. The interval between blowdowns is often between about 50 and 2000 seconds. The timing is typically set to stabilize the pressure drop in the mixing vessel while effectively removing sludge and solids.

For comparison, when remanufacturing frac fluid flowback, the top blowdown valve may be open for an interval of about 4 to about 12 seconds. The bottom blowdown valve may be open for an interval of about 4 to about 12 seconds. The interval between blowdowns is often between about 200 and 1800 seconds.

In one embodiment, blowdown sludge and solids combine in a manifold and are sent to a container such as a dumpster. When full, the dumpster water is recycled back to the wastewater feed tank 12, so there is no wastewater leaving the process. Solids are filtered and collected by the replaceable filter membrane in the dewater dumpster and solids and membrane are disposed of in a landfill.

Ozone Generation. Ozone generation can be accomplished using a commercial Corona Discharge unit such as those manufactured by Plasma Technics Inc. in Racine, Wis. Oxygen obtained from oxygen-enriched gas flows through a machined aluminum block. High voltage is applied to the internal portion of the block where said oxygen enriched gas flows thru and is converted to ozone. A chiller cools the plasma blocks to enable ozone generation. The ozone produced contains about 60 to 70 vol % ozone with the balance being converted by the heat of process. Equipment design and operation for enriched oxygen and ozone production are known by those skilled in the art.

The ozone produced is quite corrosive. Suitable materials for piping the ozone produced include Teflon®, PTCFE, Kynar®, Hastelloy-C®, silicone, glass, and the like. In one embodiment, Teflon® is used to transfer the ozone.

Product Fluid Properties. Wastewater treated using the presently disclosed inventive process, the product water is clear, essentially free from carbon-based impurities, H2S, iron and bacteria. When wastewater from oil or gas wells is treated using the presently disclosed inventive process, the product water is again clear, essentially free from carbon-based impurities, H2S, iron and bacteria, but it retains all or most of the salt content. This salt is a necessary component of water injected in many formations because the salt prevents swelling of the clays. The pH is generally neutral ranging from about 6.9 to about 7.3, and the oxidation reduction potential (ORP) is very high ranging from about 510 to about 675. Because of the high salinity and ORP and the purity and clarity of the product water produced by the inventive process described herein, the water is referred to as a "structured fluid." A chemical analysis of a structured fluid sample is provided in the Examples below.

Other unique properties include that it is free from further treatment chemicals, solids are filtered to 5 micron or less, and the fluid is significantly electrically negative.

Structured Fluid Uses. The structured fluid produced by the presently disclosed process can be used for a number of applications including, but not limited to, bacteria control, paraffin control, asphaltene control, corrosion control, frac fluid, frac fluid clay size reduction agent, acidation fluid, drilling fluid, completion fluid, skim oil recovery enhancer, disposal well maintenance, pressure reducer, condenser water system cleanup fluid, chill water system cleaner, water flood make up, and water flood recovery stimulation fluid.

In one embodiment, the structured fluid can be used as a replacement for hydrochloric acid for acidizing an oil well. Although the pH of the structured fluid is neutral, it is believed that the high salt content and high ionic potential allows the fluid to react with the formation to functionally replace the acid without the corrosion problems associated with hydrochloric acid.

Injection of the structured fluid in an oil or gas well can also inoculate both the formation and the well bore from bacteria growth, therefore greatly reducing or preventing H2S, scale, and paraffin formation.

The ability to re-use the structured water at the well site can significantly reduce or eliminate the need for wastewater injection sites as well as reduce the cost of generating fracing fluids and other aqueous fluids needed at the well. This ability to recycle produced waters can greatly benefit the oil and gas industry. It is anticipated that a treatment facility at the well site can be operated using produced water and remanufacturing a saline water that can be reinjected at a fraction of the cost presently needed.

Example 1

Figure 15:
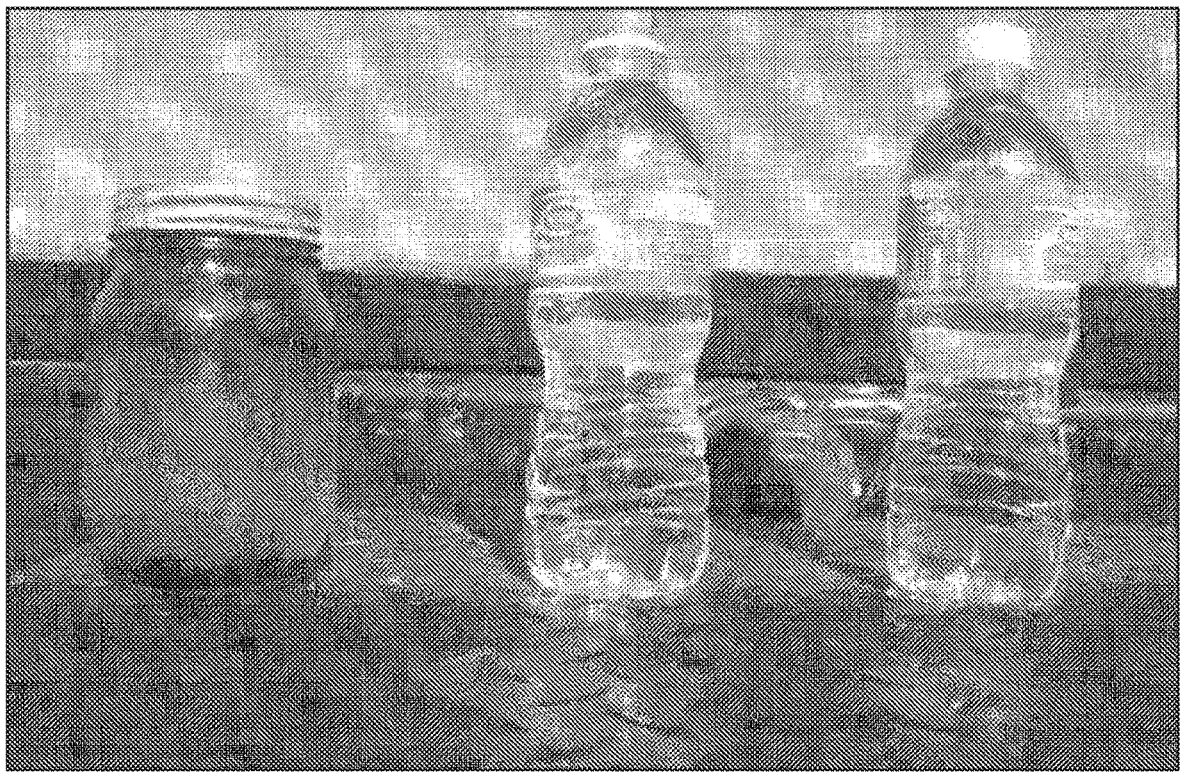
FIG. 15 is a photographic comparison of a gas well wastewater, water remanufactured from the wastewater, and a bottle of NESTLE™ drinking water.

Produced water from a gas well was remanufactured with ozone as described above. The produced water contained 15,000 ppm total dissolved solids (TDS) and 270 ppm total organic carbon (TOC). After treatment as described above, the discharge water contained 900 ppm TDS and zero TOC. FIG. 15 is a photograph comparing the produced water feed with the remanufactured water. The photograph also shows a bottle of NESTLE™ drinking water for additional comparison. The clarity of the remanufactured water nearly surpasses the drinking water.

Example 2

A chemical analysis of a sample of remanufactured water is shown in Table 1 below. It can be seen that this remanufactured water can be readily used for injection in an oil or gas well including use as a fracing fluid.

TABLE 1

| Remanufactured Water Analysis | |
|---|---|
| Specific Gravity @ 60° F. | 1.0450 |
| pH | 7.3 |
| Bicarbonate as mg/L HCO3 | 671 |
| Carbonate as mg/L CO3 | 0 |
| Dissolved CO2 | 74 |
| Dissolves H2S | ND |
| Ionic Strength, mols/L | 2.0080 |
| Resistivity, ohms/m @ 77° F. | 0.090 |
| Specific Gravity | 1.0705 |
| Barium, mg/L | ND |
| Calcium, mg/L | 3600 |
| Iron, mg/L | 0.74 |
| Magnesium, as mg/L Mg | 486 |
| Potassium, mg/L | 3820 |
| Sodium, mg/L | 34381 |
| Sulfate, as mg/L | 1316 |
| Chloride, as mg/L | 65337 |
| Total Hardness as CaCO3 | 11000 |
| Total Dissolved Solids, calculated mg/L | 109612 |
| Total Suspended Solids, mg/L | 190 |

Example 3

Produced water from a gas well in New Mexico was treated in a pilot plant using 6 mixing vessels for staged ozonation. Ozone was added in a venturi mixer to fluid which was then pumped to the upper portion of each mixing vessel. The remanufactured fluid was "clear" as described in Example 1 above. However, when a lesser amount of ozone was added to a mixer/injector positioned near the bottom of each tank, the resulting voltage differential in the mixing vessel resulted in a very rapid oxidation wherein organics and dissolved solids became suspended and flocculated.

Sequential removal of these flocculates from both the top and bottom of each mixing vessel kept the flocculate from re-dissolving. The ORP of the resulting remanufactured water was consistently above 500 mV. Generally, the ORP was maintained between 500 mV and 650 mV while the produced water fed to the pilot plant was generally negative, at around −40 mV for example. This water had improved properties and is sometimes referred to as "structured fluid."

Example 4

Structured fluid as described in Example 3 was tested as a replacement for hydrochloric acid in treatment of a non-productive formation of a commercial well to see if the structured fluid would "open" the formation. A third-party acid pumping company was used such that the only operating difference was the fluid used. The feedback on location during the job was that this was "the best acid job they have ever performed." The pressure curves followed the engineering perfectly with a bell type curve rather than the typical jagged peaks that come as the pressures are ramping up and decreasing.

When the job began and after the lines were pressure tested, the pump was started using structured fluid as in Table 1 at a rate of 3.4 BPM which quickly increased to 4.1 BPM. The immediate pressure increased at the beginning from 55 PSI on the tubing to 5000 PSI with only 4.8 BBLS pumped in. At this point, the pressure breaks and the pump rate steadily increased toward the 5 BPM mark as more structured fluid entered the formation.

As the job progressed, the pump rate stayed between 4 BPM and 5 BPM while the pressure slowly climbed up to 5000 PSI and then back down. This is a well-engineered bell curve and the structured fluid performed perfectly. At the end of the job after the last 5000 PSI break at 1.5 BPM, the pump rate rapidly increased to 4.5 BPM as the pressure dropped from 5,000 psi all the way to 2,000 psi and then the pumps were shut down as the operators saw the 5, 10, and 15 minute drop off showing that the formation was broken and that the well was flowing with the final pressure being 971 PSI with a final casing pressure of 42 PSI. The results are interesting because the fluid was forced through a new perforation and was able to penetrate into the formation while having no corrosive properties and standing pH of 7.2. The end results were as if the fluid had been a medium range hydrochloric acid or low-grade sulfuric acid in terms of formational penetration. The job showed that a pH of 7.2 structured fluid with highly charged ionic properties can effectively break down formation. If this had been attempted with fresh water (having similar pH) the result would have been 5,000 psi and zero fall off; in other words, the fresh water would have hit the new perforations and pressured not only the tubing, but would need to have been bled off at the surface through the pumping equipment.

Example 5

Figure 16:
FIG. 16 is a photographic top view of a jar of paraffin contaminate as found in a producing well.
Figure 17:
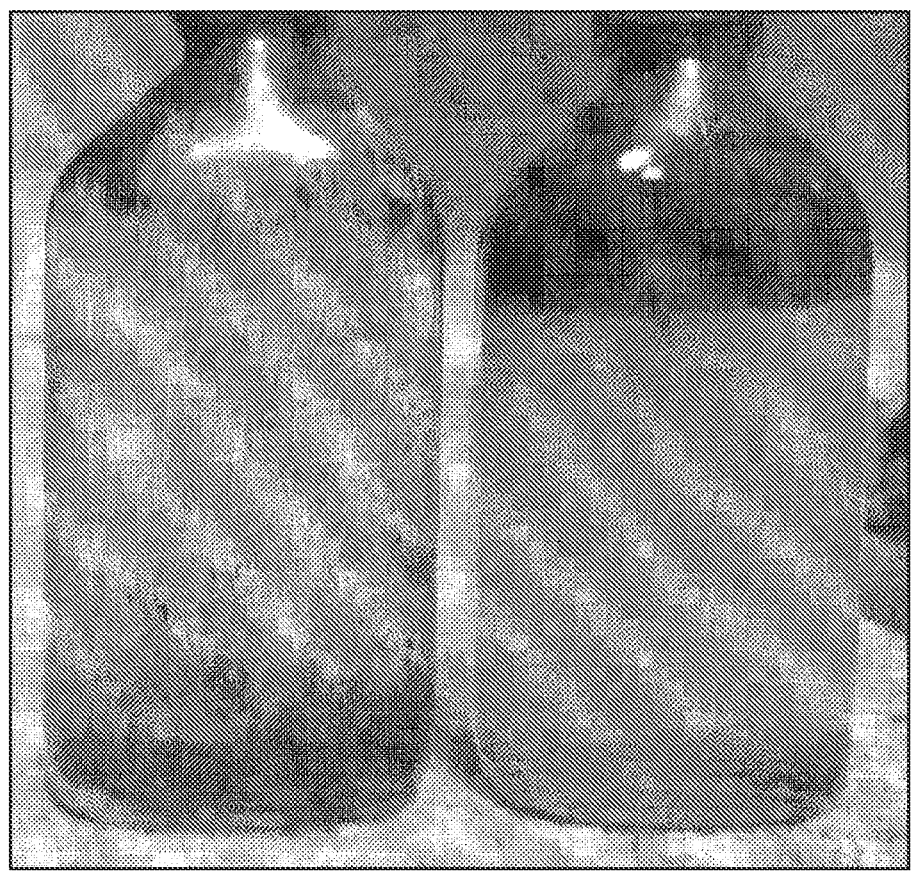
FIG. 17 is a photographic comparison of the paraffin dissolved in remanufactured water and the paraffin remaining and floating in salt water.

Structured fluid remanufactured as in Example 3 was tested for its ability to re-dissolve paraffins found at producing wells. These paraffins tend to drop out of the oil and plug the formation near producing wells. Periodic removal of the paraffins can help maintain production rates. A photograph of paraffin contaminant as found in a well is shown in FIG. 16. Equal portions of this paraffin were added to a jar of structured fluid and to a jar of synthetic salt water. Each jar was shaken and allowed to sit for 7 minutes. FIG. 17 shows the paraffin in the left jar was completely dissolved in the structured fluid. Paraffin in the salt water (jar on the right) remained undissolved and floating at the meniscus of the jar on the right.

Example 6

Structured fluid remanufactured as in Example 3 was also tested for its biocidal properties. The water produced at the well bore contains aerobic iron oxidizing bacteria which form ferric hydroxide that can damage the formation. Anaerobic sulfate-reducing bacteria are also present and lead to the build-up of H2S and corrosiveness of the water. Yet other bacteria form slime. While ozonated water has decreased bacterial activity, the structured fluid has <10 cfu/mL as determined by the BART test (biological activity reaction test) which is a quantitative test and descriptive for identifying bacteria types.

Although the presently disclosed inventive concept(s) has been described in conjunction with the specific language set forth herein above, it is evident that many alternatives, modifications, and variations will be apparent to those skilled in the art. Accordingly, it is intended to embrace all such alternatives, modifications, and variations that fall within the spirit and broad scope of the presently disclosed inventive concept(s). Changes may be made in the construction and the operation of the various components, elements, and assemblies described herein, as well as in the steps or the sequence of steps of the methods described herein, without departing from the spirit and scope of the presently disclosed inventive concept(s).

What is claimed is:

1. A process for treating water containing impurities, the process comprising:
   in a mixing vessel, continuously treating the water with a first oxidizing agent,
      wherein the first oxidizing agent is dispersed into the water in an upper portion of the mixing vessel, and a second oxidizing agent is concurrently dispersed into the water in a lower portion of the mixing vessel;
   continual or cyclic removal of contaminants floating to the top of the mixing vessel and contaminants settling to the bottom of the mixing vessel; and
   withdrawing treated water from the mixing vessel.

2. The process of claim 1, wherein the first oxidizing agent is one or more of ozone, hydrogen peroxide, chlorine or potassium permanganate.

3. The process of claim 1, wherein the second oxidizing agent is one or more of ozone, hydrogen peroxide, chlorine or potassium permanganate.

4. The process of claim 1, wherein the contaminants floating to the top include cyclohexanol.

5. The process of claim 1, wherein the contaminants floating to the top include cyclohexanone.

6. The process of claim 1, wherein the contaminants floating to the top include lithium.

7. The process of claim 1, wherein the contaminants floating to the top include methyl isobutyl ketone.

8. The process of claim 1, wherein the contaminants floating to the top include pyridine.

9. The process of claim 1, wherein the contaminants floating to the top include ammonia.

10. The process of claim 1, wherein the contaminants floating to the top include benzene.

11. The process of claim 1, wherein a greater amount of the first oxidizing agent is added to the water entering the upper portion of the mixing vessel relative to the second oxidizing agent dispersed into the water in the lower portion of the mixing vessel.

12. The process of claim 1, wherein the water comprises water from oil or gas wells.

13. The process of claim 12, further including separating crude oil from the water prior to treating the water with the first oxidizing agent in the mixing vessel.

14. The process of claim 12, further including filtering the water to remove solids prior to treating the water with the first oxidizing agent in the mixing vessel.

15. The process of claim 1, further comprising recycling of the treated water for oil or gas well injection.

* * * * *